Oct. 3, 1967  R. J. BARBU  3,344,467
MEAT PRESS

Filed Aug. 23, 1965  3 Sheets-Sheet 1

INVENTOR
RICHARD J. BARBU

BY Borst & Borst
ATTORNEYS

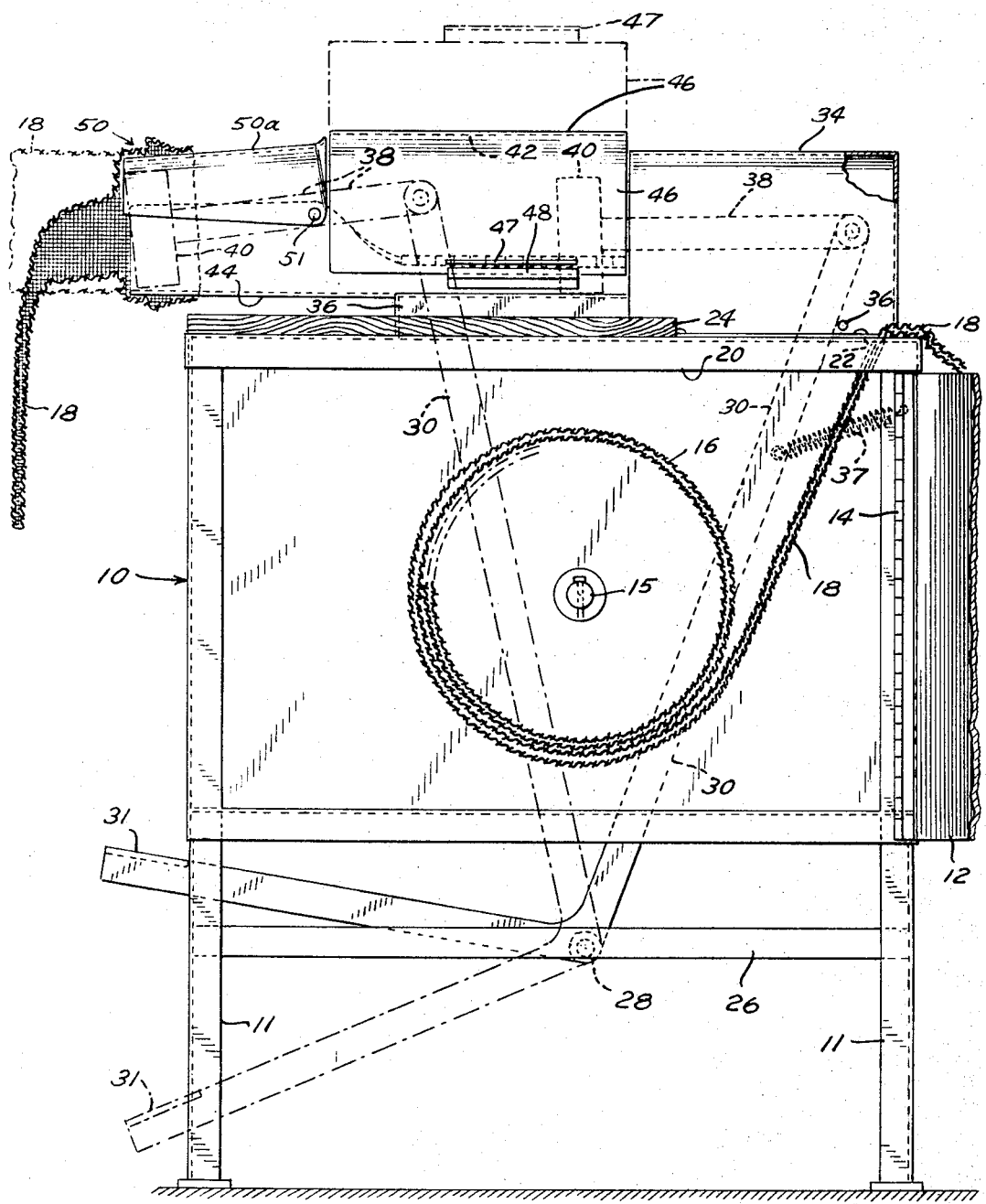

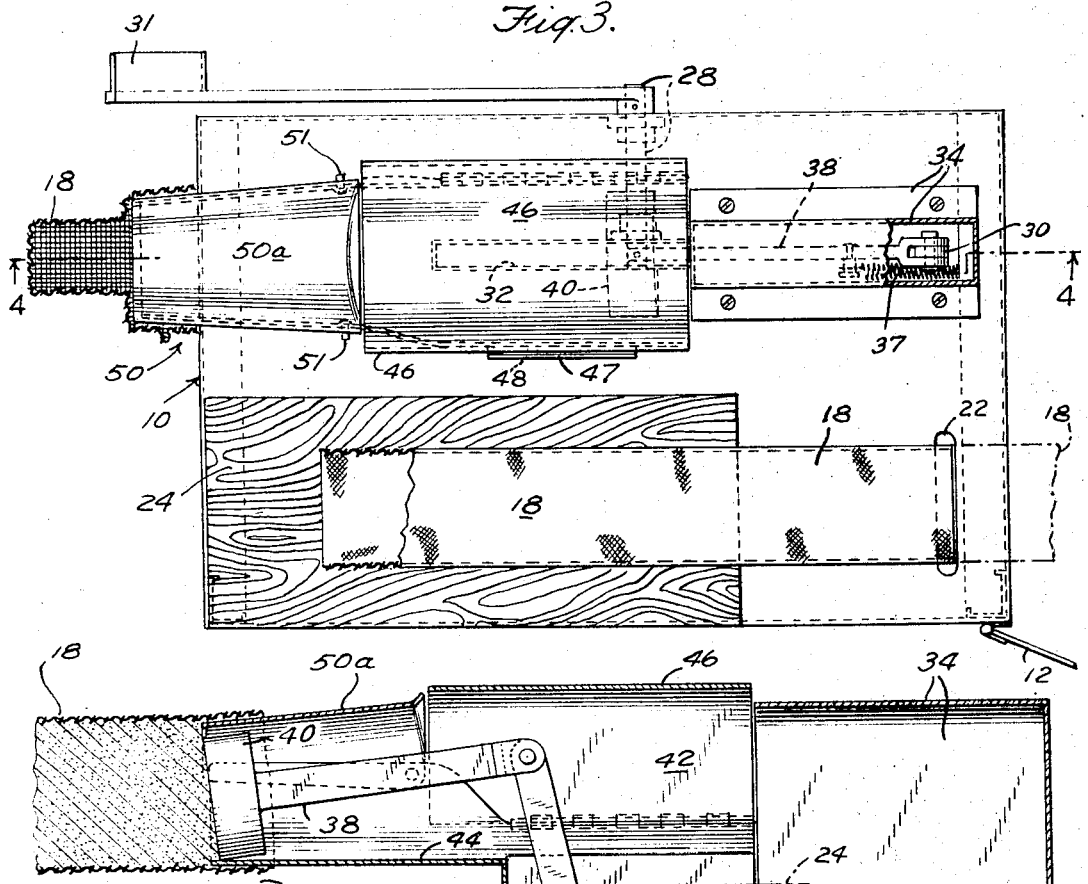
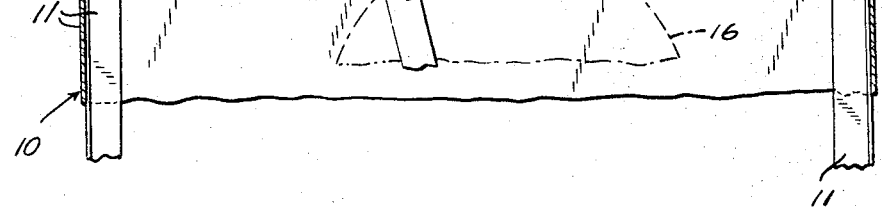

3,344,467
MEAT PRESS
Richard J. Barbu, Lindenhurst, N.Y., assignor to Markbar Corporation, Garden City, N.Y., a corporation of New York
Filed Aug. 23, 1965, Ser. No. 481,576
1 Claim. (Cl. 17—38)

ABSTRACT OF THE DISCLOSURE

A meat press having a meat chamber and a communicating horn forwardly tapered out of which the meat is pressed into casings. Pedal means are provided to cause a piston pushing on the meat to move arcuately resulting in a bottom wall scraping movement by the piston head within the tapered horn.

---

This invention relates to apparatus for pressing food products and in particular to meat presses for compacting the meat and ejecting it in the compacted state into casings.

One of the usual methods of actuating meat stuffers in the past is to provide a pneumatic press for compressing the meat and stuffing the latter into netted casings. Pneumatic presses are, of course, expensive and involve mechanical complexity which it would be desirable to minimize if not entirely eliminate. To this end the present invention provides a manually operated stuffer which is both easy to operate and cheap to produce.

The instant stuffer is provided with a two part cylinder each part having a pivoted top member. One such member is opened for filling the cylinder with the meat product. The other part is known usually as the horn for the meat casing the pivoted top of which yields slightly under pressure to hold the casing in place as it is being stuffed with the meat product.

One object of the invention is to provide a new and improved meat stuffer.

Another object of the invention is to provide an improved stuffer which is especially designed for manual operation thus affording efficient operation and economy of manufacture.

Other objects and advantages of the invention may be perceived on reading the following detailed description of one embodiment thereof which is taken in conjunction with the accompanying drawings, in which:

FIGURE 2 is a side elevation of the meat stuffer on a larger scale prior to the ejection of the meat loaf with the roll supply door open;

FIGURE 3 is a plan view of the stuffer with certain parts in section; and

FIGURE 4 is a vertical section taken on line 4—4 of FIGURE 3 showing the meat loaf in fully ejected position.

Figure 1:
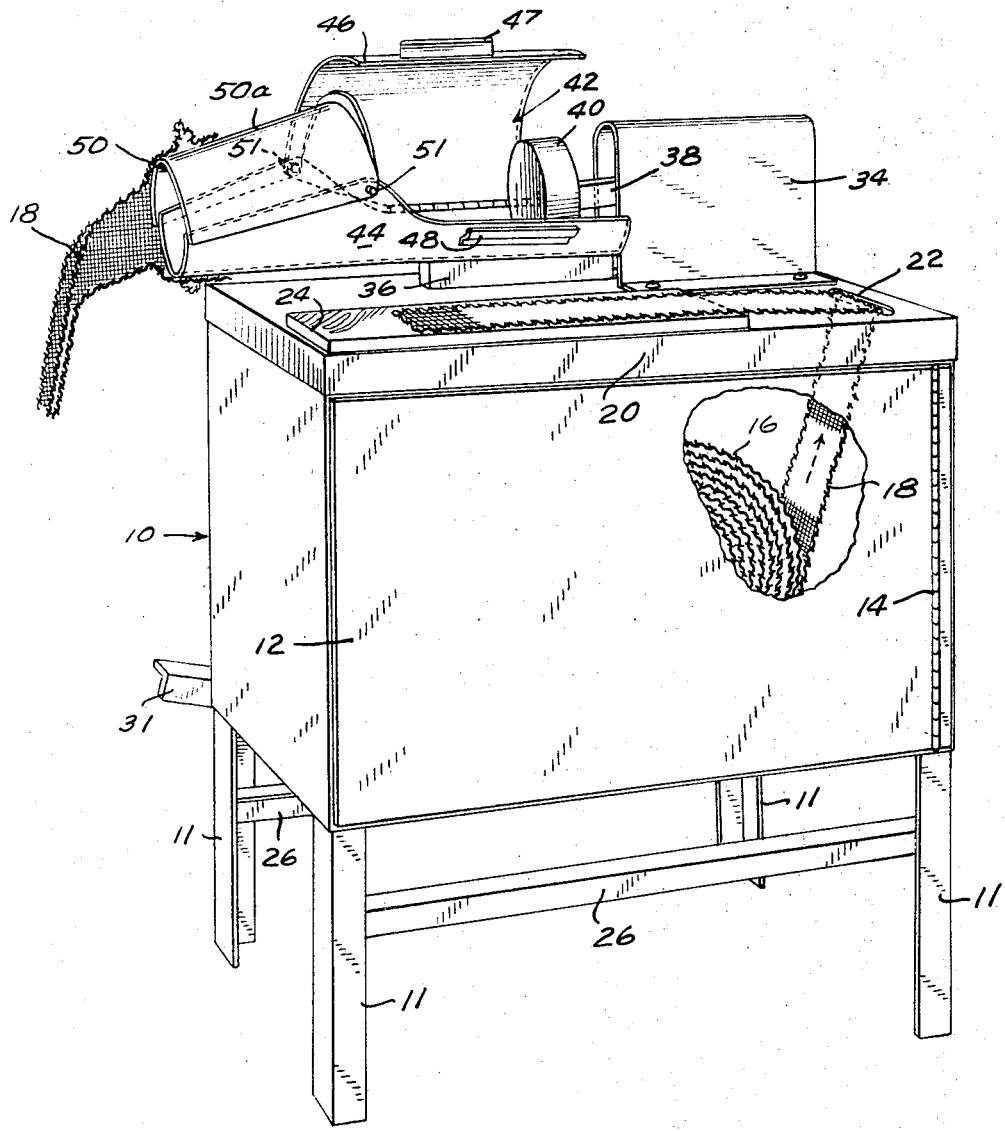
FIGURE 1 is a perspective view of the meat stuffer in open position prior to loading same.

Referring to the drawings the meat stuffer is supported by a cabinet 10 having four legs 11 and a door 12 for access to the interior of the cabinet. The door is pivotally secured to the cabinet by means of a piano hinge 14.

Within the cabinet there is rotatably supported on shaft 15 a reel 16 about which is laid netted casing 18. The cabinet has a top 20 having a transverse slot 22 through which the casing material passes before being disposed on cutting board 24 where the material is cut into casings for use in association with the stuffer.

Extending between the legs 11 on each side of the unit are cross bars 26 in which shaft 28 is journalled. Mounted on the shaft 28 is arm 30 inside the cabinet having a pedal extension 31 located outside thereof. The arm extends through a longitudinal slot 32 formed in member 20 and extending nearly its entire length. Piston rod housing 34 is supported at one end of the member 20, and carries in its interior a stop 36 for the arm 30. Spring 36 extending between the arm 30 and the end of the cabinet 10 urges the arm against its stop.

Pivotally connected to the arm is piston rod 38 having a piston head 40 which in the normal position of the arm is contained within meat filling chamber 42. The chamber communicates with the housing 34 and is formed by the inner portion of stuffer tray 44 and lid 46 which is in hinged connection with one side of the tray. The lid is provided with a handle 47 proximate its free, longitudinal edge which in closed position of the lid is disposed between the upper side of the tray and a catch member 48 secured to this side.

Horn 50 comprises the outer portion of the tray 44 and tapered top 50a which is pivoted on pins 51.

In practice the meat casing 18 is drawn over the end of the horn 50 and the meat product is placed in the chamber 42. As the operator steps on the pedal 31 the piston head leaves the housing 34 and presses on the meat in the chamber causing it to travel through the horn 50. The horn opens slightly against the casing arranged thereon for receiving the compressed meat after travelling through the stuffer, the casing thus being prevented from being displaced from the horn.

Various modifications of the device as above described may be effected by persons skilled in the art without departing from the scope and principle of the invention as defined in the appended claim.

What is claimed is:

A meat stuffer comprising a meat chamber, a forwardly tapered horn communicating with said chamber, a casing disposed over the outer end of said horn, means for compressing a meat product in said chamber and ejecting the meat through said horn and into said casing, a cabinet supporting said stuffer, said means including a piston head and piston rod arranged to enter said chamber and said horn, an arm pivotally secured to and downwardly depending from said piston rod and a pedal extension of said arm, said arm being pivotally mounted at a stationary site on said cabinet located rearwardly of and below said horn whereby said piston rod is moved arcuately so as to cause the piston head to scrape the bottom of said horn for removal of substantially all the compressed meat product therefrom.

References Cited
UNITED STATES PATENTS

| | | |
|---|---|---|
| 1,986,868 | 1/1935 | Walter _____ 17—38 X |
| 2,337,406 | 12/1943 | Opie _____ 53—258 X |
| 2,685,996 | 8/1954 | Shoffner et al. _____ 53—258 |

FOREIGN PATENTS 87,701   7/1956   Norway.

LUCIE H. LAUDENSLAGER, *Primary Examiner.*